United States Patent
Matsumoto et al.

(10) Patent No.: US 12,551,966 B2
(45) Date of Patent: Feb. 17, 2026

(54) RESISTANCE SPOT WELDING METHOD OF ALUMINUM MATERIAL, CONTROL DEVICE OF RESISTANCE SPOT WELDING OF ALUMINUM MATERIAL, AND RESISTANCE SPOT WELDING MACHINE

(71) Applicant: NADEX CO., LTD., Nagoya (JP)

(72) Inventors: Tsuyoshi Matsumoto, Kanagawa (JP); Seiji Katayama, Aichi (JP); Ayaka Mizuno, Aichi (JP); Kenji Sahashi, Aichi (JP)

(73) Assignee: NADEX CO., LTD., Nagoya (JP)

( * ) Notice: Subject to any disclaimer, the term of this patent is extended or adjusted under 35 U.S.C. 154(b) by 980 days.

(21) Appl. No.: 17/769,265

(22) PCT Filed: Oct. 16, 2020

(86) PCT No.: PCT/JP2020/039040
§ 371 (c)(1),
(2) Date: Apr. 14, 2022

(87) PCT Pub. No.: WO2021/075533
PCT Pub. Date: Apr. 22, 2021

(65) Prior Publication Data
US 2023/0226637 A1 Jul. 20, 2023

(30) Foreign Application Priority Data
Oct. 18, 2019 (JP) .................................. 2019-191537

(51) Int. Cl.
*B23K 11/18* (2006.01)
*B23K 11/11* (2006.01)
(Continued)

(52) U.S. Cl.
CPC ........... *B23K 11/115* (2013.01); *B23K 11/185* (2013.01); *B23K 11/24* (2013.01); *B23K 11/3009* (2013.01)

(58) Field of Classification Search
CPC . B23K 11/115; B23K 11/241; B23K 2103/10; B23K 11/185; B23K 11/24; B23K 11/11
See application file for complete search history.

(56) References Cited

U.S. PATENT DOCUMENTS

2003/0192863 A1* 10/2003 Wang ................. B23K 11/3018
219/117.1
2008/0102308 A1* 5/2008 Doira .................... B23K 11/115
428/653
(Continued)

FOREIGN PATENT DOCUMENTS

| CN | 101961814 A1 | 2/2011 |
| CN | 102139405 A | 8/2011 |

(Continued)

OTHER PUBLICATIONS

International Search Report issued Dec. 15, 2020 in PCT/JP2020/039040 (with English translation), 5 pages.
(Continued)

*Primary Examiner* — Tiffany T Tran
(74) *Attorney, Agent, or Firm* — Oblon, McClelland, Maier & Neustadt, L.L.P.

(57) ABSTRACT

A plurality of aluminum materials overlapped with each other are sandwiched between electrodes for spot welding. After main energization to form a nugget between the aluminum materials sandwiched between the electrodes, pulsation energization in which energization and stop of the energization are repeated a plurality of times is performed. A current value in the pulsation energization is set to be greater than a current value of the main energization, the energization and stop of the energization are repeated at least (Continued)

three times in the pulsation energization, and an energization stop period is increased from a first half of the pulsation energization to a second half of the pulsation energization.

10 Claims, 9 Drawing Sheets

(51) Int. Cl.
  *B23K 11/24* (2006.01)
  *B23K 11/30* (2006.01)

(56) References Cited

U.S. PATENT DOCUMENTS

| | | |
|---|---|---|
| 2011/0097594 A1 | 4/2011 | Tanaka et al. |
| 2011/0180518 A1 | 7/2011 | Hasegawa et al. |
| 2014/0175065 A1 | 6/2014 | Hosokawa et al. |
| 2015/0053655 A1* | 2/2015 | Sigler .............. B23K 11/115 219/91.22 |
| 2016/0008912 A1 | 1/2016 | Schroth et al. |
| 2016/0082543 A1 | 3/2016 | Wakabayashi et al. |
| 2016/0144451 A1 | 5/2016 | Fujimoto et al. |
| 2016/0228973 A1 | 8/2016 | Fujimoto et al. |
| 2017/0232547 A1 | 8/2017 | Chai et al. |
| 2018/0304397 A1 | 10/2018 | Nie et al. |
| 2019/0030637 A1 | 1/2019 | Wakabayashi et al. |
| 2021/0237193 A1 | 8/2021 | Aoki et al. |

FOREIGN PATENT DOCUMENTS

| | | |
|---|---|---|
| CN | 2013-151016 A | 8/2013 |
| CN | 105358284 A | 2/2016 |
| CN | 105636735 A | 6/2016 |
| CN | 107088701 A | 8/2017 |
| CN | 108890110 A | 11/2018 |
| CN | 109500483 A | 3/2019 |
| JP | 4-178274 A | 6/1992 |
| JP | 5-383 A | 1/1993 |
| JP | 7-32163 A | 2/1995 |
| JP | 3862640 B2 | 12/2006 |
| JP | 102059439 A | 5/2011 |
| JP | 2013-151018 A | 8/2013 |
| JP | 2014-205174 A | 10/2014 |
| JP | 104619451 A | 5/2015 |
| JP | 105263663 A | 1/2016 |
| JP | 2019-508253 A | 3/2019 |
| WO | WO 2005/016590 A2 | 2/2005 |
| WO | WO 2013/031247 A1 | 3/2013 |
| WO | WO 2017/142828 A1 | 8/2017 |
| WO | WO 2019/203364 A1 | 10/2019 |

OTHER PUBLICATIONS

Written Opinion of the International Searching Authority issued Dec. 15, 2020 in PCT/JP2020/039040, (submitting English translation only), 6 pages.

International Search Report issued Jul. 9, 2019 in PCT/JP2019/016905 (with English translation), 4 pages.

Written Opinion of the International Searching Authority issued Jul. 9, 2019 in PCT/JP2019/016905, (submitting English translation only), 7 pages.

Combined Chinese Office Action and Search Report issued Jul. 14, 2021 in Chinese Patent Application No. 201980026484.8 (with English translation), 16 pages.

Office Action mailed Oct. 5, 2023, in co-pending U.S. Appl. No. 17/048,845.

Office Action mailed Mar. 15, 2024, in co-pending U.S. Appl. No. 17/048,845.

Office Action mailed Jan. 6, 2025 in co-pending U.S. Appl. No. 17/048,845, 36 pages.

Office Action mailed Jun. 25, 2025 in co-pending U.S. Appl. No. 17/048,845, 39 pages.

* cited by examiner (A)

(B)

(C)

(D)

(E)

(F)

RESISTANCE SPOT WELDING METHOD OF ALUMINUM MATERIAL, CONTROL DEVICE OF RESISTANCE SPOT WELDING OF ALUMINUM MATERIAL, AND RESISTANCE SPOT WELDING MACHINE

CROSS-REFERENCE TO RELATED APPLICATIONS

The present application is a 35 U.S.C. § 371 national stage application of International patent application PCT/JP2020/039040, filed Oct. 16, 2020, which is based on and claims the benefit of priority to Japanese Application No. 2019-191537, filed Oct. 18, 2019. The entire contents of these applications are incorporated herein by reference.

TECHNICAL FIELD

The present invention relates to a resistance spot welding method of aluminum material, a control device for resistance spot welding of aluminum material, and a resistance spot welding machine.

BACKGROUND ART

Since aluminum material has lower electrical resistance and higher thermal conductivity than steel material, when resistance spot welding is performed, a welding current needs to be about 3 to 4 times higher than the welding current in the case of the steel material, and a pressing force exerted on an electrode in the spot welding needs to be about 1.5 times higher than the pressing force in the case of the steel material. Therefore, it is very difficult to apply proper welding conditions for the resistance spot welding of the steel material to the resistance spot welding of the aluminum material, and it is necessary to find new welding conditions suitable for the aluminum material.

As a resistance spot welding method of aluminum material, for example, Patent Literature 1 discloses a technique in which a pressing force exerted on an electrode is changed in two stages, and a current value is changed in two stages (from a high current to a low current) in accordance with the pressing force.

In addition, Patent Literature 2 discloses a technique in which a cooling time is put after main energization of welding, and after the cooling time, tempering energization is performed under a current smaller than that of the main energization.

CITATION LIST

Patent Literature

Patent Literature 1: Japanese Patent No. 3862640
Patent Literature 2: JP H05-383 A

SUMMARY OF INVENTION

Technical Problem

When aluminum material is subjected to resistance spot welding, blowholes may be formed in an aluminum molten pool serving as a nugget by evaporation of an oxide film, rust, moisture, or attached substance such as an organic substance on a plate or sheet surface, or a component having a high vapor pressure in the material.

In general, it is common that when the blowholes exist in a joint of the aluminum material, elongation of the joint decreases, ductility of the joint is lost, and brittle fracture is likely to occur. In particular, when the aluminum material is used as a structural member requiring high strength, the presence of the blowholes greatly affects reliability of the structural member.

In the above Patent Literatures, various resistance spot welding methods of aluminum material have been proposed, but there are many aspects in which a phenomenon regarding formation of the nugget has not been elucidated in detail, and it is still impossible to control the blowholes to meet a level sufficient for practical use.

A generation rate of the blowholes increases with deterioration of the electrode due to an increase in the number of welding points. Therefore, in order to prevent the generation of the blowholes, dressing of the electrode has to be performed frequently.

An object of the present invention is to provide a resistance spot welding method of aluminum material, a control device for resistance spot welding of aluminum material, and a resistance spot welding machine, through which quality of a welded portion can be improved by controlling distribution and size of blowholes generated in a nugget while reducing an electrode dressing frequency.

Solution to Problems

The present invention includes the following embodiments.

(1) A resistance spot welding method of aluminum material, comprising, in the following order:
a first step of sandwiching a plurality of aluminum materials overlapped with each other between electrodes for spot welding;
a second step of performing main energization to form a nugget between the aluminum materials sandwiched between the electrodes; and
a third step of performing pulsation energization in which energization between the electrodes and stop of the energization are repeated a plurality of times before the nugget is completely solidified, thereby forming, inside the nugget, a shell and a solidified portion of the aluminum material alternately from an outer edge portion of the nugget toward a nugget center portion in a cross section in an overlapping direction of the aluminum material, the shell having a solidified structure different from that of the solidified portion of the aluminum material,
wherein in the third step,
a current value in the pulsation energization is set to be equal to or greater than a current value of the main energization,
the energization and stop of the energization are repeated at least three times in the pulsation energization, and
an energization stop period is gradually increased from a first half of the pulsation energization to a second half of the pulsation energization.

(2) A control device of resistance spot welding by which a plurality of aluminum materials overlapped with each other are welded,
wherein the control device performs main energization to form a nugget by spot welding;
performs, after completion of the main energization, pulsation energization to form, inside the nugget, a shell and a solidified portion of the aluminum material alternately from an outer edge portion of the nugget toward a nugget center portion in a cross section in an overlapping direction of the aluminum material, the shell having a solidified structure different from that of the solidified portion of the aluminum material;

sets a current value in the pulsation energization to be equal to or greater than a current value of the main energization;

repeats the energization and stop of the energization at least three times in the pulsation energization; and controls the pulsation energization such that an energization stop period is gradually increased from a first half of the pulsation energization to a second half of the pulsation energization.

(3) A resistance spot welding machine of aluminum material, comprising: the control device according to (2).

Advantageous Effects of Invention

In the present invention, quality of a welded portion can be improved by controlling the distribution and size of blowholes generated in the nugget while reducing the electrode dressing frequency.

Figure 3:
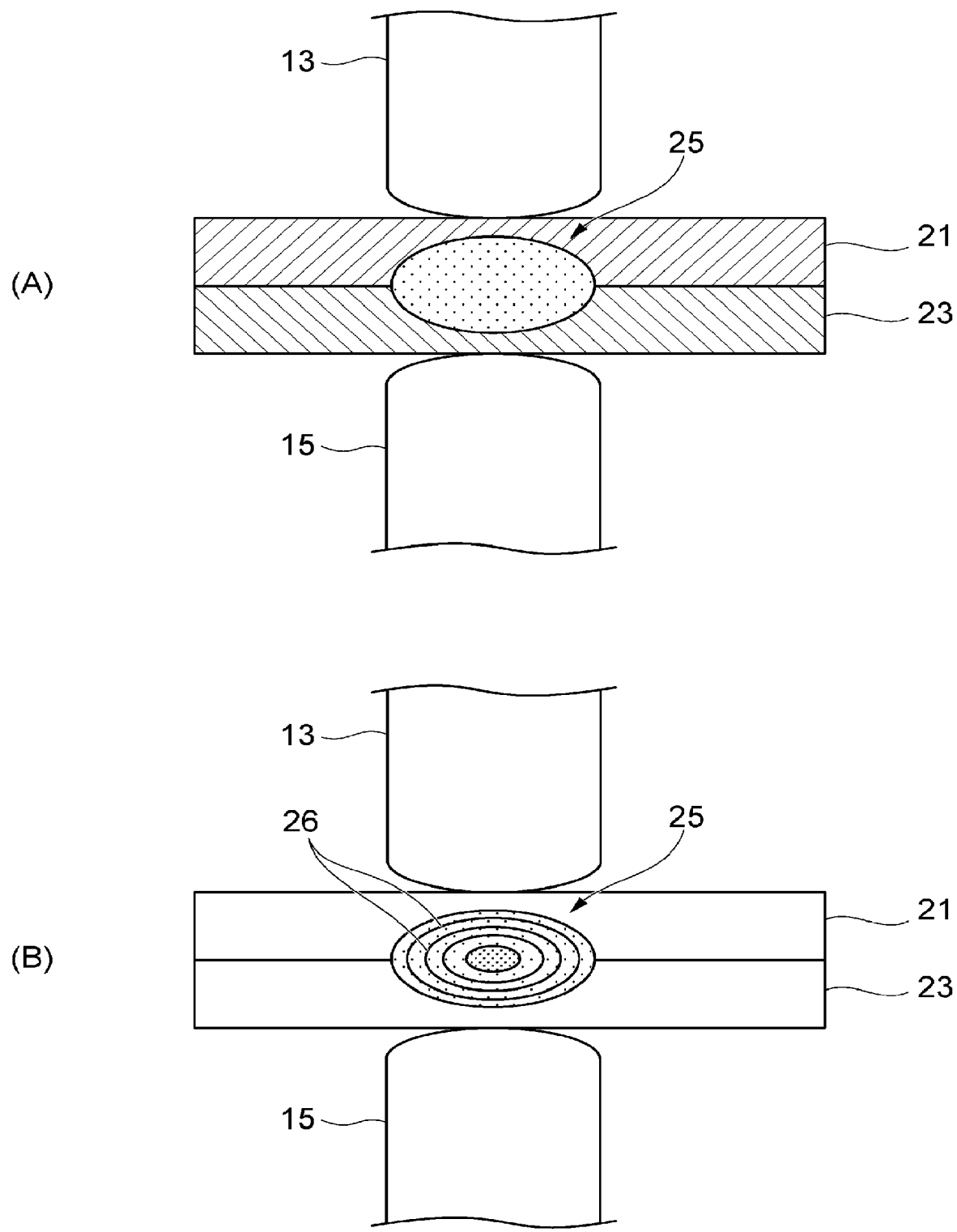

(A) and (B) of FIG. 3 are step explanatory diagrams schematically showing a state of a nugget from the main energization to the pulsation energization.

Figure 4:
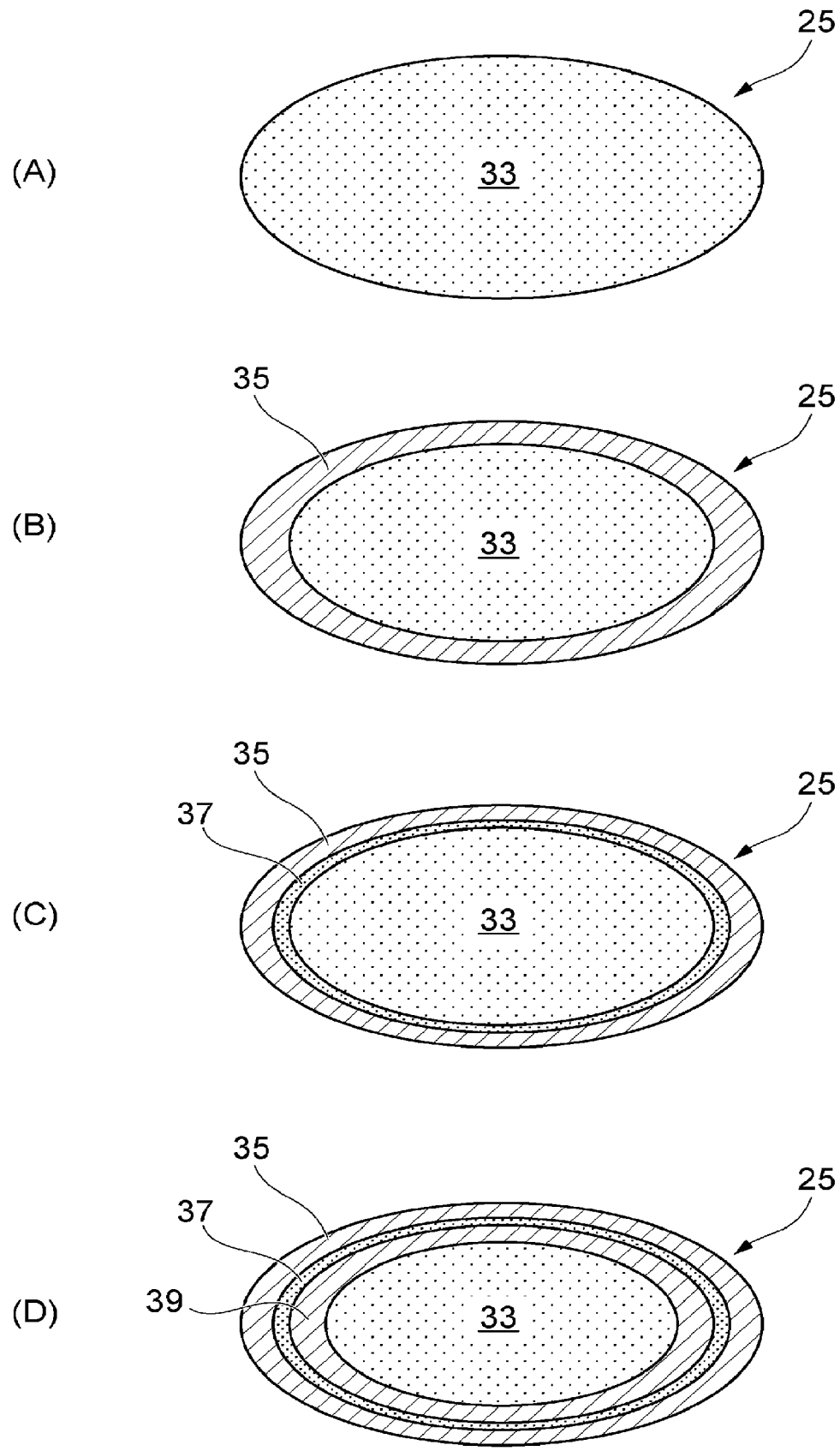

(A) to (D) of FIG. 4 are explanatory diagrams schematically showing a formation state of a nugget.

Figure 5:
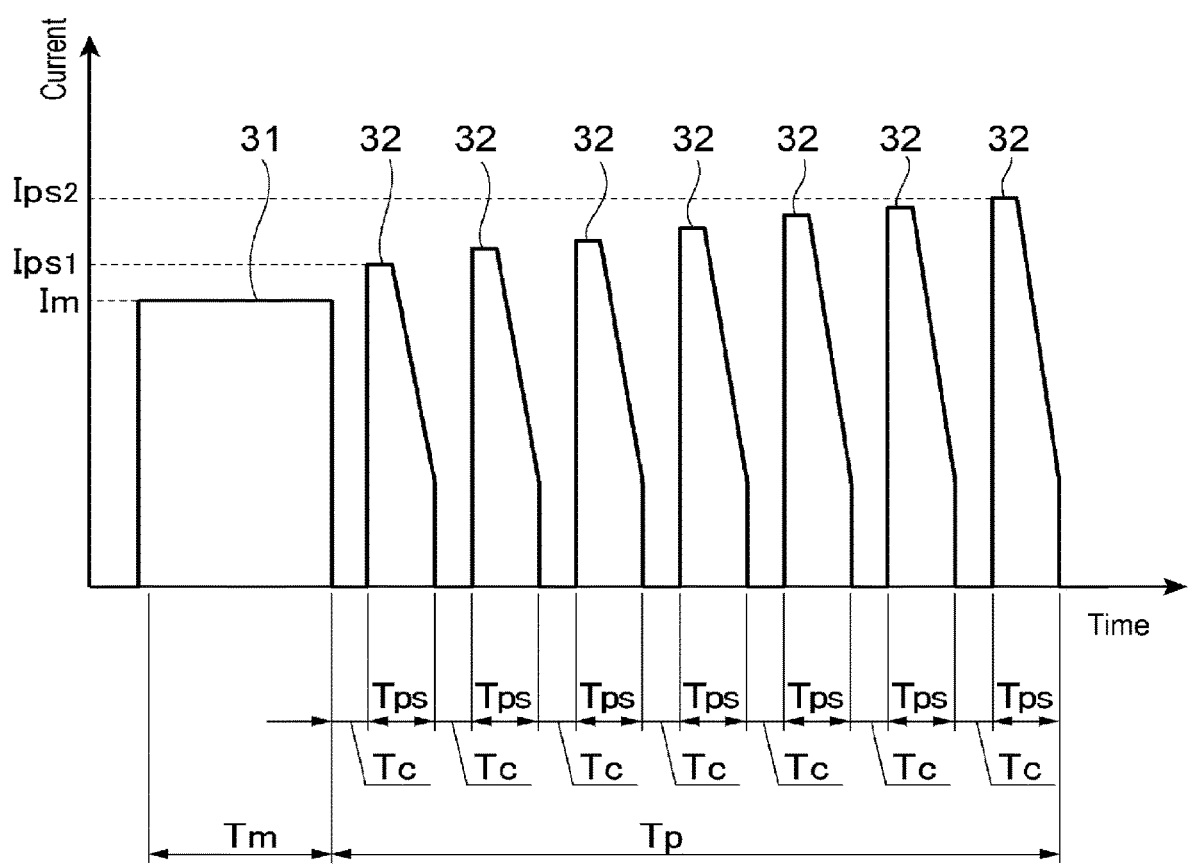

FIG. 5 is a timing chart showing an example of a waveform of a welding current in a resistance spot welding method in a reference example in which main energization and pulsation energization are performed.

Figure 6:
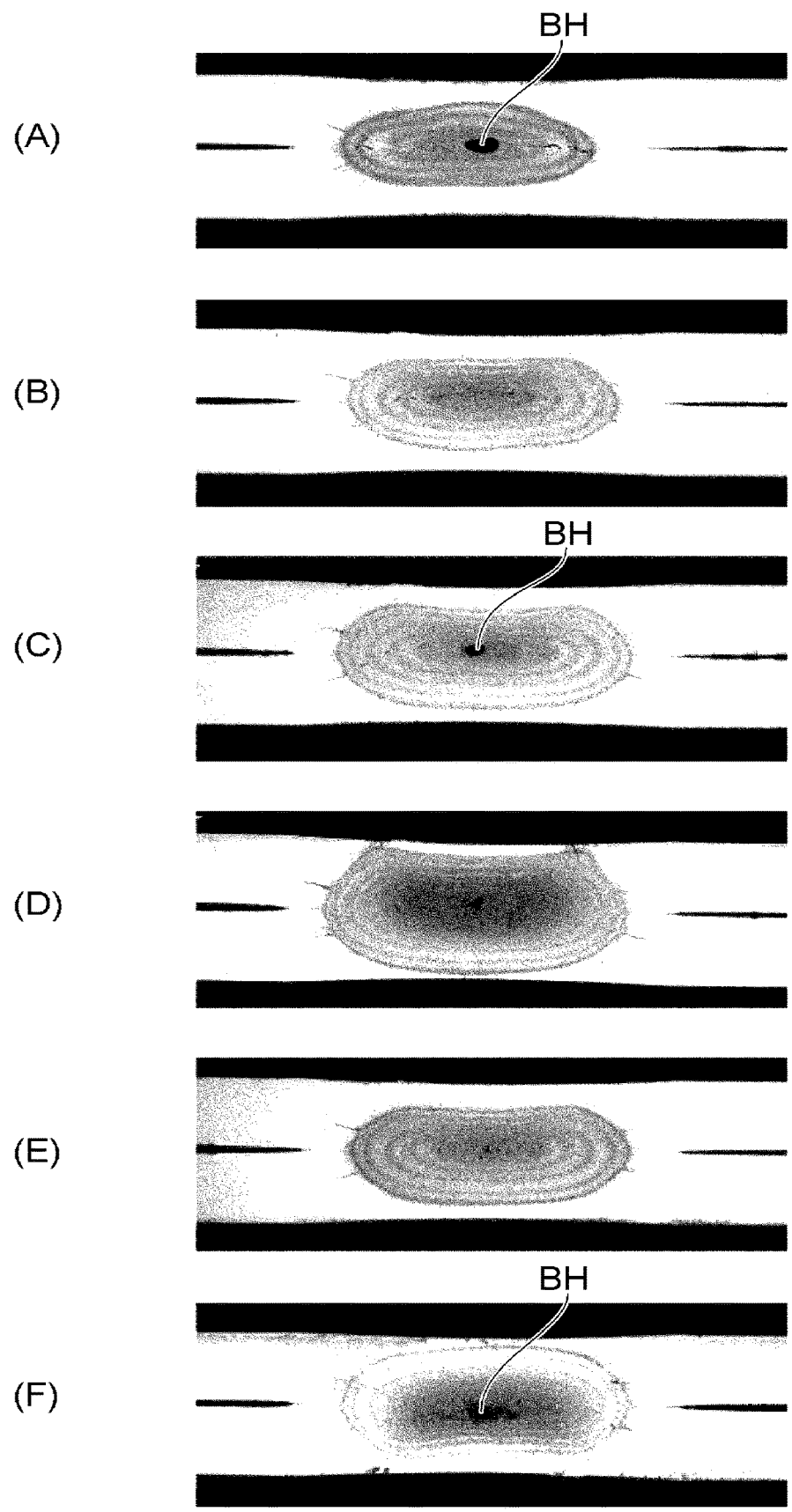

(A) to (F) of FIG. 6 are cross-sectional photographs of nuggets at each welding point formed under the welding conditions in Example 1.

Figure 7:
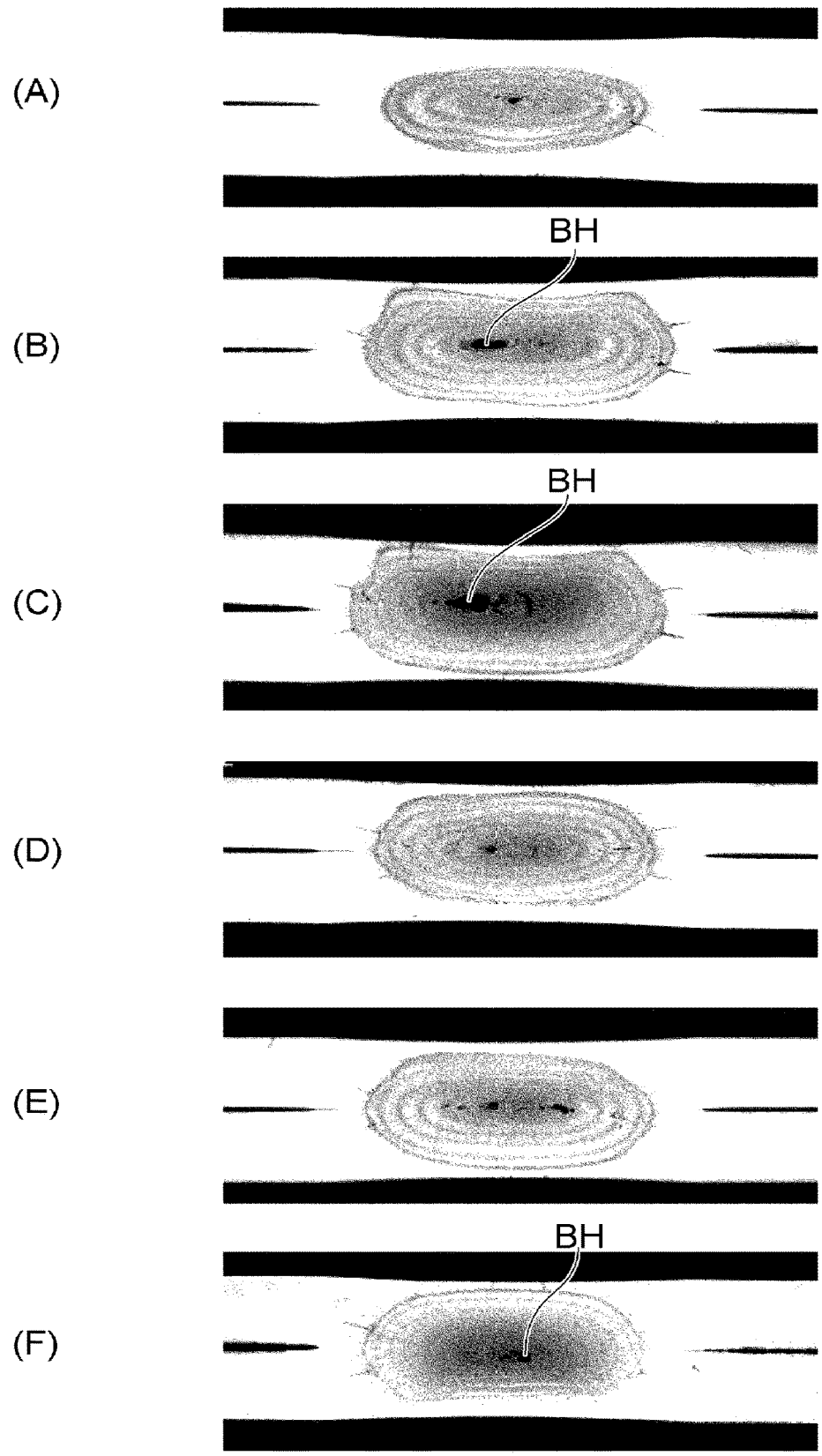

(A) to (F) of FIG. 7 are cross-sectional photographs of nuggets at each welding point formed under the welding conditions in Example 2.

Figure 8:
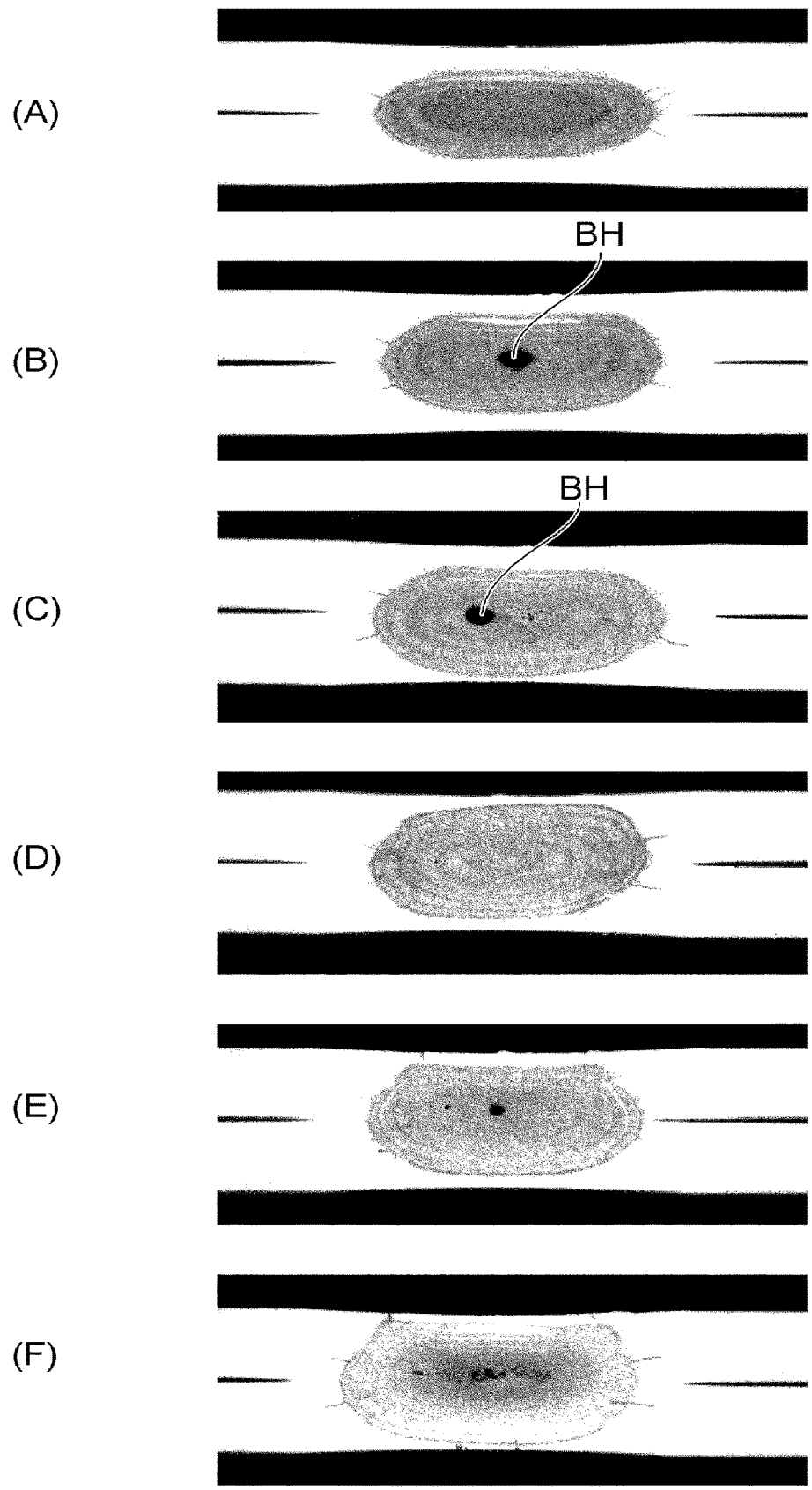

(A) to (F) of FIG. 8 are cross-sectional photographs of nuggets at each welding point formed under the welding conditions in Example 3.

Figure 9:
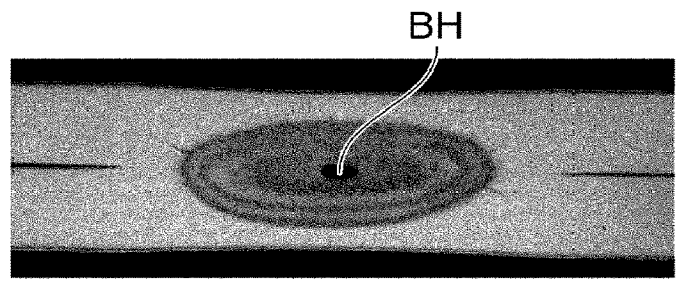
Figure 9:
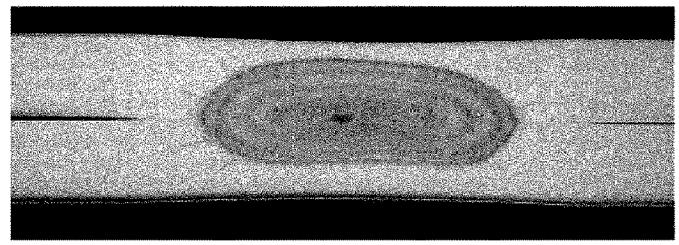
Figure 9:
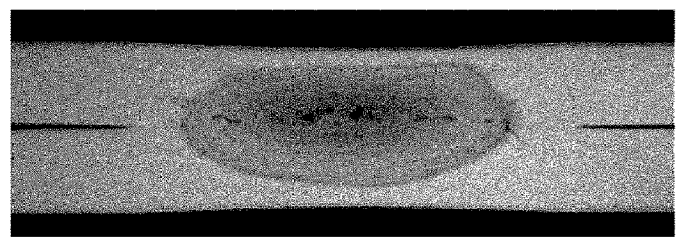
Figure 9:
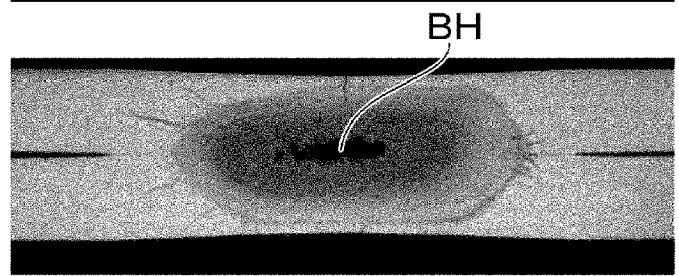
Figure 9:
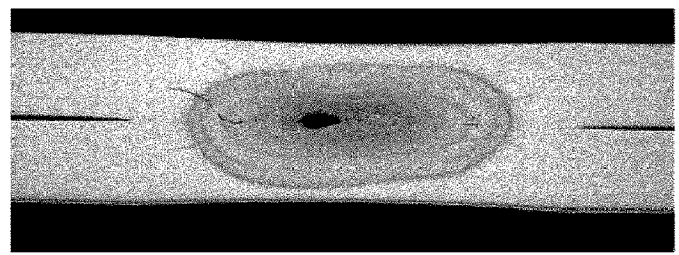
Figure 9:
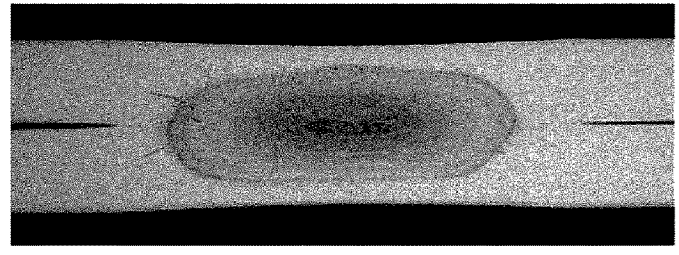

(A) to (F) of FIG. 9 are cross-sectional photographs of nuggets at each welding point formed under the welding conditions in Comparative Example.

DESCRIPTION OF EMBODIMENTS

Hereinafter, embodiments of the present invention are described in detail with reference to the drawings.

Figure 1:
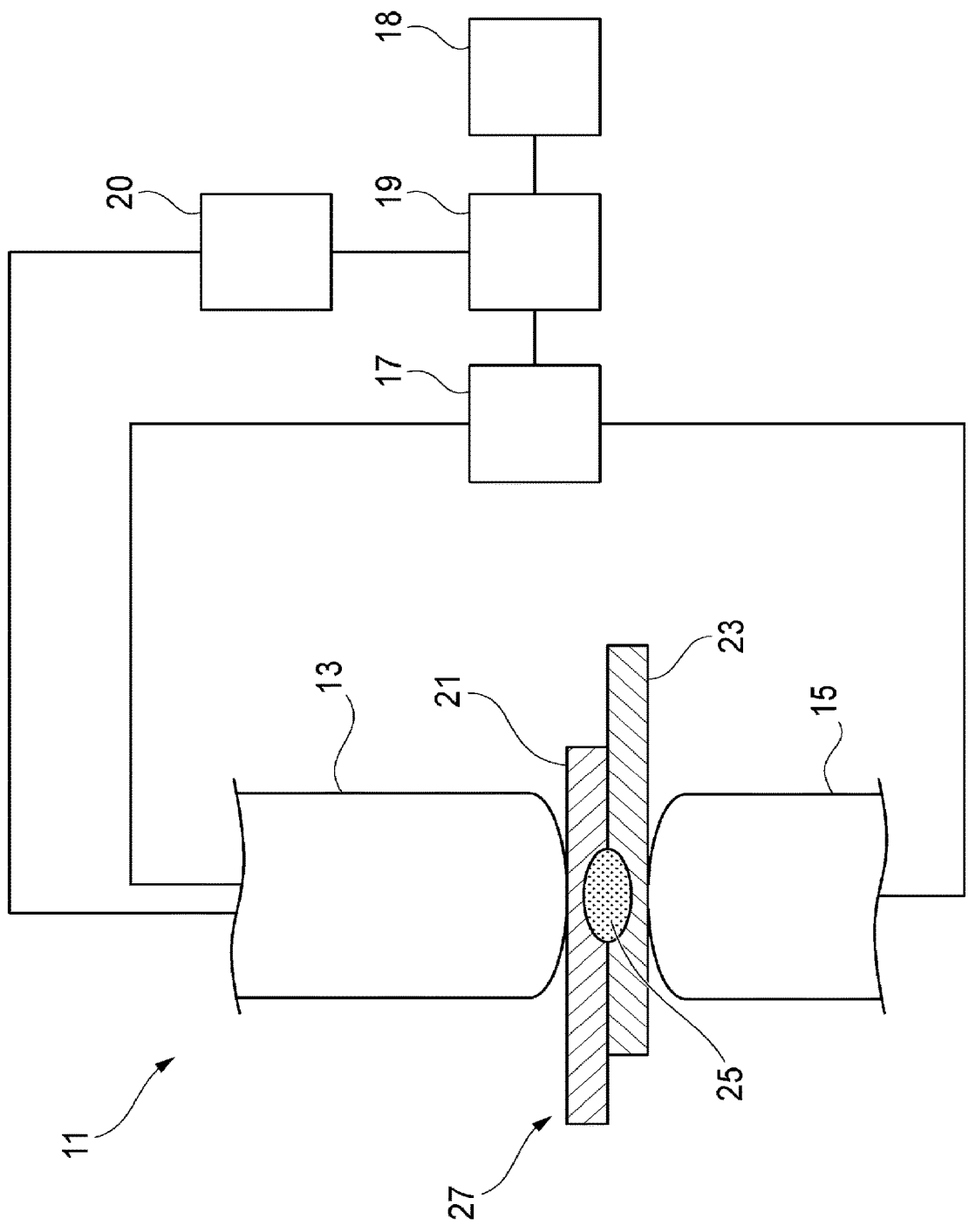
FIG. 1 is a schematic configuration diagram of a spot welding machine for welding aluminum material.

FIG. 1 is a schematic configuration diagram of a spot welding machine for welding aluminum material.

As shown in FIG. 1, a spot welding machine 11 includes a pair of electrodes 13 and 15, a welding transformer unit 17 connected to the pair of electrodes 13 and 15, a power supply unit 18, a control unit 19 that supplies welding power from the power supply unit 18 to the welding transformer unit 17, and an electrode driving unit 20 that moves the pair of electrodes 13 and 15 in an axial direction. The control unit 19 comprehensively controls a welding current, an energization period, a pressing force exerted on the electrode, an energization timing, a pressing timing, a holding period, and the like.

The spot welding machine 11 sandwiches at least two aluminum plates or sheets, i.e. a first aluminum plate or sheet 21 and a second aluminum plate or sheet 23, which are aluminum materials and overlapped with each other, between the pair of electrodes 13 and 15. Then, the first aluminum plate or sheet 21 and the second aluminum plate or sheet 23 are pressed in a thickness direction by the driving of the electrodes 13 and 15 by the electrode driving unit 20. In a pressed state, the welding transformer unit 17 energizes the electrodes 13 and 15 based on a command from the control unit 19. Accordingly, a nugget (spot welded portion) 25 is formed between the first aluminum plate or sheet 21 and the second aluminum plate or sheet 23 sandwiched between the electrodes 13 and 15, and a resistance spot welded joint (joined body) 27 of aluminum material in which the first aluminum plate or sheet 21 and the second aluminum plate or sheet 23 are integrated is obtained.

In the above example, the resistance spot welded joint 27 of the aluminum material is obtained by joining two aluminum plates or sheets, and the present invention is not limited to the case of joining two aluminum plates or sheets, and is suitably used also in the case of joining at least three aluminum plates or sheets.

In the following description, an overlapping direction of the first aluminum plate or sheet 21 and the second aluminum plate or sheet 23 is also referred to as a thickness direction or a nugget thickness direction (penetration depth direction). As for the nugget, a direction orthogonal to the overlapping direction and radially extending from a nugget center is defined as a nugget radial direction, and a maximum diameter in a direction orthogonal to the nugget thickness direction is defined as a nugget diameter. The nugget thickness direction is also referred to as a nugget penetration depth direction since the nugget has a maximum thickness in the thickness direction of the aluminum plate or sheet.

<Aluminum Material>

As the aluminum material of the first aluminum plate or sheet 21 and the second aluminum plate or sheet 23 and the aluminum material constituting each aluminum plate or sheet in the case of using at least three aluminum plates or sheets, aluminum or an aluminum alloy of any material can be used. Specifically, in addition to 5000 series, 6000 series, 7000 series, 2000 series, and 4000 series aluminum alloys, 3000 series and 8000 series aluminum alloys, and 1000 series (pure aluminum) aluminum can be used. Each aluminum plate or sheet may be made of the same material, or may be a plate set or sheet set in which different materials are combined.

A thickness of each of the first aluminum plate or sheet 21 and the second aluminum plate or sheet 23 (including another aluminum plate or sheet in a case of using another aluminum plate or sheet) is preferably 0.5 mm or more, and more preferably 2.0 mm or more for the use of a structural member such as a framework member of an automobile. The thickness of each of the aluminum plates or sheets may be the same, or one of the aluminum plates or sheets may be thicker than the other. The form of the aluminum material is not limited to the aluminum plate or sheet (rolled plate or sheet) described above, and may be extruded material, forged material, or cast material.

<Welding Condition>

Figure 2:
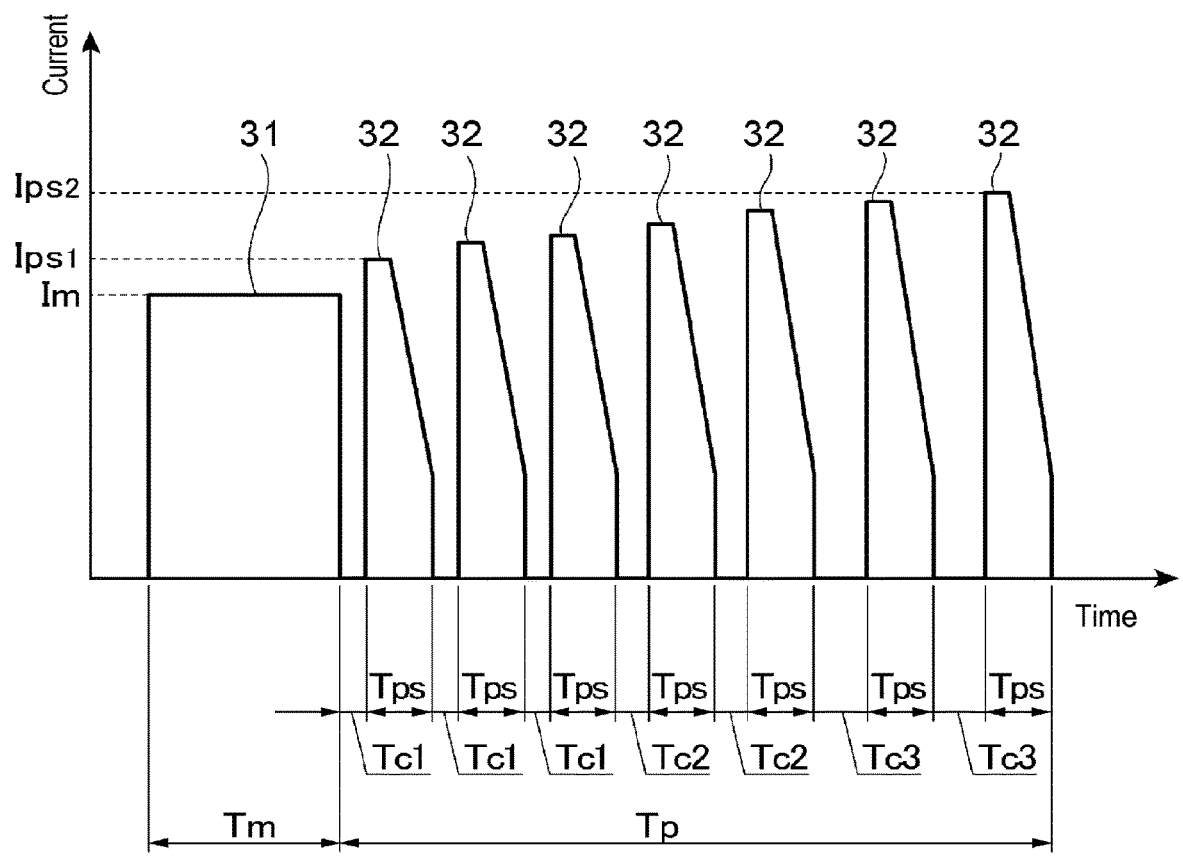
FIG. 2 is a timing chart showing an example of a waveform of a welding current in a resistance spot welding method in the present embodiment in which main energization and pulsation energization are performed.

The control unit 19 energizes the pair of electrodes 13 and 15 from the welding transformer unit 17 at a predetermined timing. FIG. 2 is a timing chart showing an example of a waveform of a welding current.

As for the waveform of the welding current in the illustrated example, there are a main energization step (energization period $T_m$) by a continuous energization 31, and a pulsation energization step (total energization period $T_p$) in which energization with a current of a pulse (energization period $T_{Ps}$) 32 having a short energization period is repeated.

In the pulsation energization step, stop of energization and the energization with the pulse 32 are repeated at least three times. In this example, in the pulsation energization, the stop of energization and the energization with the pulse 32 are repeated seven times. Further, a current value in the pulsation energization step is gradually increased from a current value $I_{ps1}$ of the first pulse 32 to a current value $I_{ps2}$ of the seventh pulse 32. Then, the current values $I_{ps1}$ to $I_{ps2}$ of the pulses 32 in the pulsation energization are made higher than a current value $I_m$ of the main energization by the continuous energization 31.

Further, in the pulsation energization, an energization stop period is gradually increased from the first half of the pulsation energization to the second half of the pulsation energization. For example, in the pulsation energization, the first energization stop period to the third energization stop period are set at the same energization stop period $T_{c1}$, the fourth and fifth energization stop periods are set at the same energization stop period $T_{c2}$, and the sixth and seventh energization stop periods are set at the same energization stop period $T_{c3}$. Then, the fourth and fifth energization stop periods $T_{c2}$ are longer than the first to third energization stop periods $T_{c1}$, and the sixth and seventh energization stop periods $T_{c3}$ are longer than the fourth and fifth energization stop periods $T_{c2}$.

An energization waveform of the continuous energization 31 in the main energization step and the energization waveform of the pulse 32 in the pulsation energization step may be a rectangular shape, another waveform such as a triangular wave or a sine wave, or a waveform subjected to down-slope control or up-slope control. In the illustrated example, the continuous energization 31 has a constant current, and the pulse 32 has a waveform obtained by the down-slope control of a rectangular pulse. When the energization waveform of the pulse 32 in the pulsation energization is a waveform other than the rectangle, such as the down-slope or the up-slope, the maximum current value in each pulse 32 is set as the current value of the pulse 32.

Each of the current value $I_m$ of the continuous energization 31 in the main energization step and the current values $I_{ps1}$ to $I_{ps2}$ of the pulse 32 in the pulsation energization step are set in a range of 15 kA to 60 kA. The energization based on the current value $I_m$ of the continuous energization 31 generally determines a final size of a nugget. Therefore, an optimum current value $I_m$ may be determined depending on a welding purpose.

The current value $I_m$ of the continuous energization 31 is preferably 15 kA to 60 kA, more preferably 30 kA to 40 kA, and the energization period $T_m$ is 100 ms to 400 ms, preferably 150 ms to 250 ms, and more preferably 180 ms to 220 ms.

The current value $I_{ps1}$ to $I_{ps2}$ of the pulse 32 is preferably 15 kA to 60 kA, more preferably 30 kA to 40 kA, and the energization period $T_{ps}$ is 10 ms to 40 ms, preferably 15 ms to 29 ms, and more preferably 18 ms to 22 ms.

In the illustrated example, the current values during the energization stop periods $T_{c1}$, $T_{c2}$, and $T_{c3}$ are 0 A, i.e. the energization between the electrodes 13 and 15 is stopped, but the current values are not necessarily 0 A, and may be a current higher than 0 A as long as an amount of heat input to the first aluminum plate or sheet 21 and the second aluminum plate or sheet 23 can be reduced as compared to the case of energization.

The energization stop period $T_{c1}$ is preferably 6 ms to 20 ms, and more preferably 10 ms to 14 ms. The energization stop period $T_{c2}$ is preferably 10 ms to 40 ms, and more preferably 16 ms to 20 ms. The energization stop period $T_{c3}$ is preferably 20 ms to 50 ms, and more preferably 20 ms to 28 ms.

The number of repeated energization of the pulse 32 in the pulsation energization (the number of pulses N) is 3 or more, preferably 5 or more, and more preferably 7 or more.

<Resistance Spot Welding with Pulsation Energization Step>

(A) and (B) of FIG. 3 are step explanatory diagrams schematically showing a state of the nugget from the main energization to the pulsation energization.

As shown in (A) of FIG. 3, when the current value $I_m$ is applied to the first aluminum plate or sheet 21 and the second aluminum plate or sheet 23 sandwiched between the pair of electrodes 13 and 15 by the main energization, the nugget 25 is formed around a facing surface between the plate or sheet surfaces.

Next, as shown in (B) of FIG. 3, when the pulsation energization with a plurality of short pulses is performed, a plurality of shells 26 having an annular cross section (hereinafter, referred to as shells) are formed inside the nugget 25. When the nugget 25 is cut in the thickness direction and the cross section thereof is observed, a stripe pattern of the shell 26 extending concentrically from a center portion of the nugget 25 can be observed in the nugget 25.

The formation of the nugget 25 is described in more detail.

(A) to (D) of FIG. 4 are explanatory diagrams schematically showing a formation state of the nugget 25.

First, in the main energization, as shown in (A) of FIG. 4, the nugget 25 in a melted state (a melted nugget 33) is formed. After the formation of the melted nugget 33, the continuous energization 31 of the main energization is stopped, then cooling of the melted nugget 33 starts from an outer periphery of the melted nugget 33. Then, as shown in (B) of FIG. 4, a columnar crystal structure is developed and solidified from the outer periphery of the melted nugget 33 toward a nugget center portion, and a solidified portion (solidified structure) 35 is formed.

The pulsation energization is started before the columnar crystal structure of the solidified portion 35 is completely developed in the nugget. In the pulsation energization, the first energization with the pulse 32 is performed. As shown in (C) of FIG. 4, a portion 37 of the solidified portion 35 on a nugget center portion side is melted again, and the first energization with the pulse 32 is stopped. The portion 37 in which the columnar crystal structure is melted is cooled and solidified again after the first energization with the pulse 32 is stopped. Accordingly, as shown in (D) of FIG. 4, the portion 37 melted becomes a structure different from the columnar crystal structure and solidifies. The different structure forms the shell 26 described above.

Further, due to the progress of the cooling of the melted nugget 33, the columnar crystal structure develops again from the inside of the shell 26 toward the nugget center, and a solidified portion 39 being a second layer inside the shell is formed. Next, when the second energization with the pulse 32 is performed, a portion where the columnar crystal structure is melted again is formed in the solidified portion 39, and the melted portion becomes the solidified portion being a third layer.

In this way, after the main energization, the energization with the pulse 32 and stop of the energization are repeated a plurality of times in the pulsation energization, whereby the solidified portions 35, 39, . . . , which are the columnar crystal structures, and the shell 26 are alternately formed toward the nugget center. When the nugget 25 after the pulsation energization is observed in a cross section in the thickness direction, as schematically shown in (B) of FIG. 3, the stripe pattern such that the shell 26 is concentrically formed as a multiple ring is observed. In the shell 26 and the solidified portion 39, Mg and the like are distributed in different concentration due to segregation or reverse segregation.

As described above, as for the solidification shell in the nugget formed by performing the pulsation energization, the cooling rate is extremely high, and the solidification can be completed in a state where solubility of Mg or the like serving as a blowhole source is high. Further, by forming the ring-shaped shell up to the center portion of the nugget stepwise, growth of the blowholes can be prevented. Even if the blowholes are generated, the blowholes can be disposed in the center portion of the nugget that does not affect joint performance.

<Generation of Blowholes Due to Increase in Number of Welding Points>

In order to form the shell 26 by the pulsation energization, appropriate cooling during energization with the pulse 32 is necessary, and cooling by the electrodes 13 and 15 during the energization stop is necessary. Therefore, even when the pulsation energization is performed after the main energization, if the spot welding is continuously performed, an intermetallic compound layer adheres to a tip portion of the electrode as the number of the welding points increases, resistance heat generation by the intermetallic compound layer is accumulated, the temperature of the electrodes 13 and 15 increases, and cooling performance by the electrodes 13 and 15 decreases.

<Resistance Spot Welding Method in Reference Example>

Here, a resistance spot welding method in a reference example is described.

FIG. 5 is a timing chart showing an example of a waveform of a welding current in the resistance spot welding method in the reference example in which the main energization and the pulsation energization are performed.

As shown in FIG. 5, in the reference example, the current values $I_{ps1}$ to $I_{ps2}$ of the pulse 32 in the pulsation energization are set to be greater than the current value $I_m$ of the continuous energization 31 which is the main energization, and the energization with the pulse 32 and stop of the energization stop are repeated at least seven times. However, in the pulsation energization, each energization stop period from the first time to the seventh time is set to a constant stop period. Specifically, the energization stop period $T_c$ is set to 12 ms.

In the welding method in which the pulsation energization is performed, since the influence of the accumulation of the resistance heat generation by the intermetallic compound layer on the electrodes 13 and 15 increases with the increase of the number of the welding points, when the pulsation energization stop period is constant, the cooling performance of the electrodes 13 and 15 is not sufficiently exhibited, and tip shapes of the electrodes 13 and 15 are changed. For this reason, there is a concern that sufficient formation of the shell 26 may not be achieved with the increase in the number of welding points. Accordingly, the solubility of Mg or the like serving as the blowhole source in a solidification process of the shell 26 decreases, the size of the blowhole increases, and weld quality decreases.

<Resistance Spot Welding Method in Present Embodiment>

In the present embodiment, the current values $I_{ps1}$ to $I_{ps2}$ of the pulse 32 in the pulsation energization are set to be greater than the current value $I_m$ of the continuous energization 31 which is the main energization, the energization with the pulse 32 and stop of the energization are repeated at least three times in the pulsation energization, and the energization stop periods $T_{c1}$, $T_{c2}$, and $T_{c3}$ are gradually increased from the first half of the pulsation energization to the second half of the pulsation energization (see FIG. 2).

In this way, even when the number of the welding points increases, it is possible to reduce the influence of the accumulation of the resistance heat generation by the intermetallic compound layer on the electrodes 13 and 15, and it is possible to prevent the change of the tip shape of the electrodes 13 and 15 with a small number of the welding points. Therefore, the dressing frequency of the electrodes 13 and 15 can be reduced, the number of continuous welding points until the next dressing can be increased, and the productivity can be improved. Then, even if the number of weldable welding points is increased, the blowholes are prevented, and the stripe pattern (pulsation form) of the nugget 25 is maintained. Accordingly, it is possible to perform welding that gives excellent mechanical properties (hereinafter, referred to as the weld quality) of the welded portion.

<Other Resistance Spot Welding Method>

When the resistance spot welding with the pulsation energization in which the energization stop periods $T_{c1}$, $T_{c2}$, and $T_{c3}$ are gradually increased from the first half to the second half as described above is performed, the energization stop periods $T_{c1}$, $T_{c2}$, and $T_{c3}$ may be lengthened depending on the increase in the number of welding points by the resistance spot welding.

Specifically, when the energization stop periods $T_{c1}$, $T_{c2}$, and $T_{c3}$ up to the 20th welding point are set to 12 ms, 16 ms, and 20 ms, respectively, the energization stop periods $T_{c1}$, $T_{c2}$, and $T_{c3}$ after the 20th welding point are set to 12 ms, 20 ms, and 28 ms, respectively, and the energization stop periods $T_{c1}$, $T_{c2}$, and $T_{c3}$ after the 40th point are set to 12 ms, 24 ms, and 36 ms, respectively.

In this way, when the energization stop periods $T_{c1}$, $T_{c2}$, and $T_{c3}$ are lengthened depending on the increase in the number of welding points by resistance spot welding, it is possible to more suitably reduce the influence of accumulation of resistance heat generation by the intermetallic compound layers on the electrodes 13 and 15. Therefore, a dressing frequency of the electrodes 13 and 15 can be further reduced, and the number of continuous welding points until the next dressing can be further increased, so that productivity can be improved. In addition, even if the number of weldable welding points is increased, it is possible to implement welding with good weld quality such that the blowholes are prevented and the stripe pattern (pulsation form) is maintained.

Further, when the pulse current value of the n-th pulsation energization is $I_p(n)$, by increasing the pulse current value stepwise so as to satisfy "$I_p(n+1) > I_p(n)$", it is possible to apply heat input toward the inside (center portion) of the nugget 25 stepwise, and it is possible to form the shell 26 up to a position closer to the center portion of the nugget 25.

The pulse current may have the same current value such that "$I_p(n+1)=I_p(n)$" at a timing during a process of increasing the pulse current value stepwise.

By setting a pulse waveform in the pulsation energization to a down-slope waveform, it is possible to more effectively prevent the generation of the blowholes in the nugget 25. As a result, it is possible to further prevent the deterioration of the weld quality due to the blowholes or the like.

<Total Energization Period in Pulsation Energization>

Here, in the resistance spot welding in which the pulsation energization is performed, the quality of the welded portion (nugget) is improved by increasing the number of times of the pulsation energization to which the energization stop period is added. However, when a total energization period, which is a sum of the period of the main energization and the period of the pulsation energization, exceeds 800 ms, the productivity of the spot welding is reduced. Therefore, the total energization period is preferably 800 ms or less.

EXAMPLES

Next, examples of the resistance spot welding method of the aluminum material in the present invention are described.

Here, resistance spot welding under the different welding conditions was performed at a total of 32 welding points using two aluminum sheets of the same material and the same dimensions that were overlapped with each other, and a welding state at each welding point was observed. The welding results and states were observed at the 2nd, 7th, 12th, 22nd, 27th, and 32nd welding point.

<Test Conditions>
(Aluminum Sheet)
Material: A5182 alloy (Al—Mg aluminum alloy)
Thickness: 2.3 mm
(Electrode)
Type: Chromium copper R-type electrode
Radius of curvature of tip: 100 mm
Electrode diameter (original diameter): 19 mm
(Welding Conditions)

Example 1

1) Pressing force exerted on electrodes: 5 kN
2) Welding current
Main energization
Current value $I_m$: 31 kA
Energization period $T_m$: 200 ms
Energization waveform: rectangular wave
Pulsation energization
Initial current value $I_{ps1}$: 32.4 kA
Final current value $I_{ps2}$: 40.8 kA
Total energization period $T_p$: 388 ms
Energization period $T_{ps}$ of a single pulse: 40 ms
Number of pulses N: 7 times
Pulse waveform: down-slope control of rectangular wave
Energization stop period: first to third energization stop period $T_{c1}$: 12 ms fourth and fifth energization stop period $T_{c2}$: 16 ms sixth and seventh energization stop period $T_{c3}$: 20 ms Example 2

1) Pressing force exerted on electrodes: 5 kN
2) Welding current
Main energization
Current value $I_m$: 31 kA
Energization period $T_m$: 200 ms
Energization waveform: rectangular wave
Pulsation energization
Initial current value $I_{ps1}$: 32.4 kA
Final current value $I_{ps2}$: 40.8 kA
Total energization period $T_p$: 412 ms
Energization period $T_{ps}$ of a single pulse: 40 ms
Number of pulses N: 7 times
Pulse waveform: down-slope control of rectangular wave
Energization stop period: first to third energization stop period $T_{c1}$: 12 ms fourth and fifth energization stop period $T_{c2}$: 20 ms sixth and seventh energization stop period $T_{c3}$: 28 ms Example 3

1) Pressing force exerted on electrodes: 5 kN
2) Welding current
Main energization
Current value $I_m$: 31 kA
Energization period $T_m$: 200 ms
Energization waveform: rectangular wave
Pulsation energization
Initial current value $I_{ps1}$: 32.4 kA
Final current value $I_{ps2}$: 40.8 kA
Total energization period $T_p$: 436 ms
Energization period $T_{ps}$ of a single pulse: 40 ms
Number of pulses N: 7 times
Pulse waveform: down-slope control of rectangular wave
Energization stop period: first to third energization stop period $T_{c1}$: 12 ms fourth and fifth energization stop period $T_{c2}$: 24 ms sixth and seventh energization stop period $T_{c3}$: 36 ms Comparative Example 1) Pressing force exerted on electrodes: 5 kN
2) Welding current
Main energization
Current value $I_m$: 31 kA
Energization period $T_m$: 200 ms
Energization waveform: rectangular wave
Pulsation energization
Initial current value $I_{ps1}$: 32.4 kA
Final current value $I_{ps2}$: 40.8 kA
Total energization period $T_p$: 364 ms
Energization period $T_{ps}$ of a single pulse: 40 ms
Number of pulses N: 7 times
Pulse waveform: down-slope control of rectangular wave
Energization stop period: first to seventh energization stop period $T_c$: 12 ms <Test Results>

FIG. 6 to FIG. 9 show cross-sectional photographs of nuggets formed by the resistance spot welding in Examples 1 to 3 and Comparative Example. In FIG. 6 to FIG. 9, (A), (B), (C), (D), (E), and (F) are cross-sectional photographs of the nuggets at 2nd welding point, 7th welding point, 12th welding point, 22nd welding point, 27th welding point, and 32nd welding point, respectively.

Example 1

As shown in (A) to (F) of FIG. 6, in Example 1, slight blowholes BH were generated in the nuggets at 2nd welding point, 12th welding point, and 32nd welding point, but large blowholes BH were not present at any of 2nd welding point, 7th welding point, 12th welding point, 22nd welding point, 27th welding point, and 32nd welding point, and the form of a good stripe pattern was maintained.

Example 2

As shown in (A) to (F) of FIG. 7, in Example 2, slight blowholes BH were generated in the nuggets at 7th welding point, 12th welding point, and 32nd welding point, but large blowholes BH were not present at any of 2nd welding point, 7th welding point, 12th welding point, 22nd welding point, 27th welding point, and 32nd welding point, and the form of a good stripe pattern was maintained.

Example 3

As shown in (A) to (F) of FIG. 8, in Example 3, slight blowholes BH were generated in the nuggets at 7th welding point, and 12th welding point, but large blowholes BH were not present at any of 2nd welding point, 7th welding point, 12th welding point, 22nd welding point, 27th welding point, and 32nd welding point, and the form of a good stripe pattern was maintained.

Comparative Example

As shown in (A) to (F) of FIG. 9, in Comparative Example, slight blowholes BH were generated in the nugget at 2nd welding point, and slightly large blowholes BH were generated at 22nd welding point. In Comparative Example, a form of the stripe pattern was collapsed at 12th welding point.

As described above, it was found that, by increasing the energization stop period from the first half of the pulsation energization to the second half of the pulsation energization, even when the number of welding points increases, the generation of large blowholes is prevented, and the stripe pattern of the nugget is maintained.

The present invention is not limited to the above embodiments, and combinations of the respective configurations of the embodiments, or changes and applications made by those skilled in the art based on the description and common technology are also intended by the present invention and are included within the scope to be protected.

As described above, the present description discloses the following contents.

(1) A resistance spot welding method of aluminum material, comprising, in the following order:
a first step of sandwiching a plurality of aluminum materials overlapped with each other between electrodes for spot welding;
a second step of performing main energization to form a nugget between the aluminum materials sandwiched between the electrodes; and
a third step of performing pulsation energization in which energization between the electrodes and stop of the energization are repeated a plurality of times before the nugget is completely solidified, thereby forming, inside the nugget, a shell and a solidified portion of the aluminum material alternately from an outer edge portion of the nugget toward a nugget center portion in a cross section in an overlapping direction of the aluminum material, the shell having a solidified structure different from that of the solidified portion of the aluminum material,
wherein in the third step,
a current value in the pulsation energization is set to be equal to or greater than a current value of the main energization,
the energization and stop of the energization are repeated at least three times in the pulsation energization, and
an energization stop period is gradually increased from a first half of the pulsation energization to a second half of the pulsation energization.

In this resistance spot welding method of the aluminum material, by forming a plurality of shells toward the nugget center portion, a melted portion surrounded by the shells becomes smaller toward the center portion stepwise. Therefore, even if blowholes are generated in the nugget by the resistance spot welding, the blowholes are collected at the nugget center portion, and the weld quality does not deteriorate. As a result, the deterioration of weld quality due to the blowholes or the like is prevented.

In addition, the current value of the pulsation energization is set to be equal to or greater than the current value of the main energization, the energization and stop of the energization are repeated at least three times in the pulsation energization, and the energization stop period is gradually increased from the first half of the pulsation energization to the second half of the pulsation energization. Accordingly, even when the number of the welding points increases, the influence of accumulation of resistance heat generation of the electrode is prevented, and it is possible to prevent a change of the electrode tip shape with a small number of the welding points. Therefore, the electrode dressing frequency can be reduced, the number of continuous welding points until the next dressing can be increased, and the productivity can be improved. In addition, even if the number of weldable welding points is increased, the blowholes are prevented, and welding with good weld quality such that the stripe pattern of the nugget is maintained can be performed.

(2) The resistance spot welding method of aluminum material according to (1), wherein a pulse current value in the pulsation energization is increased stepwise.

In this resistance spot welding method of the aluminum material, by increasing the pulse current value stepwise, heat input can be applied stepwise toward the inside (center portion) of the nugget, and the shell can be formed up to a position closer to the nugget center portion.

(3) The resistance spot welding method of aluminum material according to (2), wherein at a timing during a process of increasing the pulse current value in the pulsation energization stepwise, a pulse current of the same current value is applied.

In this resistance spot welding method of the aluminum material, since it is easy to control the formation of the solidified portion and it is possible to stably gather the blowholes at the nugget center portion, it is possible to perform welding with more excellent weld quality.

(4) The resistance spot welding method of aluminum material according to any one of (1) to (3), wherein a pulse waveform in the pulsation energization is a down-slope waveform.

In this resistance spot welding method of the aluminum material, by setting the pulse waveform in the pulsation energization to the down-slope waveform, it is possible to more effectively prevent the generation of blowholes in the nugget. As a result, it is possible to further prevent deterioration of the weld quality due to the blowholes or the like.

(5) The resistance spot welding method of aluminum material according to any one of (1) to (4), wherein each of a current value in the main energization and a current value in the pulsation energization is 15 kA to 60 kA.

In this resistance spot welding method of the aluminum material, it is possible to increase a current density in a current path, promote heat generation between the aluminum materials, and perform the welding efficiently.

(6) The resistance spot welding method of aluminum material according to any one of (1) to (5), wherein the energization and stop of the energization stop are repeated at least five times in the pulsation energization.

In this resistance spot welding method of the aluminum material, the blowholes generated inside the nugget in a melted state can be collected to the nugget center portion where stress concentration is less likely to occur, and the blowholes can be made small.

(7) The resistance spot welding method of aluminum material according to (6), wherein the energization and stop of the energization are repeated at least seven times in the pulsation energization.

In this resistance spot welding method of the aluminum material, the blowholes inside the nugget in the melted state can be more reliably collected in the vicinity of the nugget center portion.

(8) The resistance spot welding method of aluminum material according to any one of (1) to (7), wherein the energization stop period in the pulsation energization is lengthened in accordance with an increase in the number of welding points in the resistance spot welding.

In this resistance spot welding method of the aluminum material, even if the number of welding points increases, it is possible to more suitably prevent the influence of accumulation of resistance heat generated by an intermetallic compound layer adhered to an electrode tip, and it is possible to prevent a change of the electrode tip shape with a small number of welding points. Therefore, since the electrode dressing frequency can be reduced, the number of continuous welding points until the next dressing can be increased, and the productivity can be improved. In addition, even if the number of weldable welding points is increased, the blowholes are prevented, and welding with good weld quality such that the stripe pattern of the nugget is maintained can be performed.

(9) A control device of resistance spot welding by which a plurality of aluminum materials overlapped with each other are welded, wherein the control device performs main energization to form a nugget by spot welding;

performs, after completion of the main energization, pulsation energization to form, inside the nugget, a shell and a solidified portion of the aluminum material alternately from an outer edge portion of the nugget toward a nugget center portion in a cross section in an overlapping direction of the aluminum material, the shell having a solidified structure different from that of the solidified portion of the aluminum material;

sets a current value in the pulsation energization to be equal to or greater than a current value of the main energization;

repeats the energization and stop of the energization at least three times in the pulsation energization; and controls the pulsation energization such that an energization stop period is gradually increased from a first half of the pulsation energization to a second half of the pulsation energization.

In this control device of resistance spot welding of the aluminum material, by forming a plurality of shells toward the nugget center portion, a melted portion surrounded by the shells becomes smaller toward the center portion stepwise. Therefore, even if blowholes are generated in the nugget by the resistance spot welding, the blowholes are collected at the nugget center portion, and the weld quality does not deteriorate. As a result, the deterioration of weld quality due to the blowholes or the like is prevented.

In addition, the current value of the pulsation energization is set to be equal to or greater than the current value of the main energization, the energization and stop of the energization are repeated at least three times in the pulsation energization, and the energization stop period is gradually increased from the first half of the pulsation energization to the second half of the pulsation energization. Accordingly, even if the number of welding points increases, influence of accumulation of resistance heat generation of the electrode by an intermetallic compound layer is prevented, and it is possible to prevent a change of the electrode tip shape with a small number of the welding points. Therefore, since the electrode dressing frequency can be reduced, the number of continuous welding points until the next dressing can be increased, and the productivity can be improved. In addition, even if the number of weldable welding points is increased, the blowholes are prevented, and welding with good weld quality such that the stripe pattern of the nugget is maintained can be performed.

(10) The control device of resistance spot welding according to (9), wherein a pulse current value in the pulsation energization is increased stepwise.

In this control device of resistance spot welding, by increasing the pulse current value stepwise, heat input can be applied stepwise toward the inside (center portion) of the nugget, and the shell can be formed up to a position closer to the nugget center portion.

(11) The control device of resistance spot welding according to (9) or (10), wherein at a timing during a process of increasing the pulse current value in the pulsation energization stepwise, a pulse current of the same current value is applied.

In this control device of resistance spot welding, since it is easy to control the formation of the solidified portion and it is possible to stably gather the blowholes at the nugget center portion, it is possible to perform the welding with more excellent weld quality.

(12) The control device of resistance spot welding according to any one of (9) to (11), wherein a pulse waveform in the pulsation energization is a down-slope waveform.

In this control device of resistance spot welding, by setting the pulse waveform in the pulsation energization to the down-slope waveform, it is possible to more effectively prevent the generation of blowholes in the nugget. As a result, it is possible to further prevent deterioration of the weld quality due to the blowholes or the like.

(13) A resistance spot welding machine of aluminum material, comprising: the control device according to any one of (9) to (12).

In this resistance spot welding machine of the aluminum material, reduction in weld quality can be prevented by collecting blowholes in the nugget center portion. As a result, it is possible to prevent the reduction in weld quality due to the control of blowholes or the like. In addition, since the electrode dressing frequency can be reduced, the number of continuous welding points until the next dressing can be increased, and the productivity can be improved. In addition, even if the number of weldable welding points is increased, the blowholes are prevented, and welding with good weld quality such that the stripe pattern of the nugget is maintained can be performed.

The present application is based on Japanese Patent Application No. 2019-191537 filed on Oct. 18, 2019, the contents of which are incorporated herein by reference.

REFERENCE SIGNS LIST

- 11 Spot welding machine
- 13, 15 Electrode
- 19 Control unit (control device)
- 21 First aluminum plate or sheet (aluminum material)
- 23 Second aluminum plate or sheet (aluminum material)
- 25 Nugget
- 26 Shell
- 35 Solidified portion

The invention claimed is:

1. A resistance spot welding method of sheets or plates of aluminum material, comprising, in the following order:
    sandwiching a plurality of sheets or plates of aluminum materials overlapped with each other between electrodes for spot welding;
    performing main energization to form a nugget between the sheets or plates of aluminum materials sandwiched between the electrodes; and
    performing pulsation energization in which energization between the electrodes and stop of the energization are repeated a plurality of times before the nugget is completely solidified, thereby forming, inside the nugget, a shell and a solidified portion of the aluminum material alternately from an outer edge portion of the nugget toward a nugget center portion in a cross section in an overlapping direction of the sheets or plates of aluminum material, the shell having a solidified structure different from that of the solidified portion of the aluminum material,
    wherein in the step of performing pulsation energization:
    a current value in the pulsation energization is set to be equal to or greater than a current value of the main energization,
    the energization and stop of the energization are repeated at least three times in the pulsation energization, and
    an energization stop period is gradually increased from a first half of the pulsation energization to a second half of the pulsation energization.

2. The resistance spot welding method of sheets or plates of aluminum material according to claim 1, wherein a pulse current value in the pulsation energization is increased stepwise.

3. The resistance spot welding method of sheets or plates of aluminum material according to claim 2, wherein at a timing during a process of increasing the pulse current value in the pulsation energization stepwise, a pulse current of the same current value is applied.

4. The resistance spot welding method of sheets or plates of aluminum material according to claim 1, wherein at a timing during a process of increasing a pulse current value in the pulsation energization stepwise, a pulse current of the same current value is applied.

5. The resistance spot welding method of sheets or plates of aluminum material according to claim 1, wherein a pulse waveform in the pulsation energization is a down-slope waveform.

6. The resistance spot welding method of sheets or plates of aluminum material according to claim 1, wherein each of the current value in the main energization and the current value in the pulsation energization is 15 kA to 60 kA.

7. The resistance spot welding method of sheets or plates of aluminum material according to claim 1, wherein the energization and stop of the energization stop are repeated at least five times in the pulsation energization.

8. The resistance spot welding method of sheets or plates of aluminum material according to claim 7, wherein the energization and stop of the energization are repeated at least seven times in the pulsation energization.

9. The resistance spot welding method of sheets or plates of aluminum material according to claim 1, wherein the energization stop period in the pulsation energization is lengthened in accordance with an increase in the number of welding points in the resistance spot welding.

10. A non-transitory computer-readable medium storing a program that, when executed by a computer, causes the computer to execute the resistance spot welding method of sheets or plates of aluminum material according to claim 1.

* * * * *